(12) United States Patent
Nakada

(10) Patent No.: US 7,296,400 B2
(45) Date of Patent: Nov. 20, 2007

(54) INTERNAL COMBUSTION ENGINE

(75) Inventor: Isamu Nakada, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 131 days.

(21) Appl. No.: 10/933,434

(22) Filed: Sep. 3, 2004

(65) Prior Publication Data

US 2005/0081514 A1  Apr. 21, 2005

(30) Foreign Application Priority Data

Oct. 21, 2003  (JP)  ............................. 2003-360999

(51) Int. Cl.
*F01N 3/00* (2006.01)
*F02M 25/06* (2006.01)

(52) U.S. Cl. .............................. 60/279; 60/278; 60/286

(58) Field of Classification Search .................. 60/278, 60/279, 286, 289, 295
See application file for complete search history.

(56) References Cited

U.S. PATENT DOCUMENTS

| | | | | |
|---|---|---|---|---|
| 3,699,683 A * | 10/1972 | Tourtellotte et al. | ........... | 60/274 |
| 5,207,734 A * | 5/1993 | Day et al. | ....................... | 60/278 |
| 5,412,946 A * | 5/1995 | Oshima et al. | ................ | 60/286 |
| 5,746,049 A * | 5/1998 | Cullen et al. | .................. | 60/274 |
| 5,943,859 A * | 8/1999 | Kawamura | .................... | 60/320 |
| 5,974,790 A * | 11/1999 | Adamczyk et al. | ............ | 60/274 |
| 6,122,908 A * | 9/2000 | Wirmark | ...................... | 60/274 |
| 6,662,552 B1 * | 12/2003 | Gunther et al. | ................ | 60/286 |
| 6,698,190 B2 * | 3/2004 | Docter et al. | .................. | 60/285 |
| 6,739,125 B1 * | 5/2004 | Mulligan | ....................... | 60/286 |
| 6,804,950 B2 * | 10/2004 | Kong et al. | .................... | 60/275 |
| 6,810,658 B2 * | 11/2004 | Kaupert et al. | ................ | 60/274 |
| 6,845,610 B2 * | 1/2005 | Shiino et al. | .................. | 60/286 |
| 6,964,158 B2 * | 11/2005 | Abdul-Khalek | .............. | 60/278 |
| 2003/0101713 A1 * | 6/2003 | Dalla Betta et al. | .......... | 60/284 |
| 2003/0226350 A1 * | 12/2003 | Liu | ............................. | 60/275 |

FOREIGN PATENT DOCUMENTS

| | | |
|---|---|---|
| EP | 1 211 394 A2 | 6/2002 |
| JP | A-54-009325 | 1/1979 |
| JP | A 54109513 | 8/1979 |
| JP | A 54118914 | 9/1979 |
| JP | A-06-264732 | 9/1994 |
| JP | A-2000-045881 | 2/2000 |
| JP | A-2001-303939 | 10/2001 |
| JP | A 2002-98010 | 4/2002 |

* cited by examiner

*Primary Examiner*—Thomas Denion
*Assistant Examiner*—Loren Edwards
(74) *Attorney, Agent, or Firm*—Oliff & Berridge, PLC

(57) ABSTRACT

An internal combustion engine capable of reforming and recycling a portion of fuel included in exhaust gas from a combustion chamber includes an exhaust passage where exhaust gas from the combustion chamber flows; a reformer that has a reforming reaction chamber including a fuel reforming catalyst; a branch passage that branches from the exhaust passage at a branch portion provided upstream from the reformer, and directs exhaust gas to the reforming reaction chamber; and a secondary air supplier and an exhaust purification catalyst serving as fuel removal means, which are provided downstream from the branch portion.

16 Claims, 1 Drawing Sheet

INTERNAL COMBUSTION ENGINE

INCORPORATION BY REFERENCE

The disclosure of Japanese Patent Application No. 2003-360999 filed on Oct. 21, 2003 including the specification, drawings and abstract is incorporated herein by reference in its entirety.

BACKGROUND OF THE INVENTION

1. Field of the Invention

The invention is related to an internal combustion engine capable of reforming and recycling a portion of fuel included in exhaust gas from a combustion chamber.

2. Description of the Related Art

There are known internal combustion engines that are provided with a reformer (catalyst device) within an exhaust passage, which includes a passage in which exhaust gas flows and a reforming catalyst disposed so as to be heated by exhaust gas flowing through the passage (refer to Japanese Patent Publication No. 60-37310 and Japanese Patent Publication No. 61-35375 for examples). In this type of internal combustion engine, fuel is mixed into a portion of exhaust gas taken from the exhaust passage downstream from the reformer. The mixture is delivered into the reforming catalyst which is heated using heat of exhaust gas in the aforementioned passage. Moreover, an endothermic reforming reaction using heat from the exhaust gas is advanced in the reforming catalyst to create a reformed fuel including hydrogen and carbon monoxide. The reformed fuel obtained is then supplied as fuel to an air intake system and reused.

In addition, there is also a known natural gas reforming engine system that reforms reforming source gas such as natural gas and supplies the reformed gas to the engine, and uses a portion of exhaust gas as additive gas for reforming source gas (refer to Japanese Patent Laid-Open Publication No. 2002-98010 for an example). In such an engine system, a heat exchanger for heating source gas and a gas reformer are disposed in this order from the upstream side of a fuel supply passage that connects a source gas supply and the engine. Furthermore, the gas reformer is provided in an exhaust passage of the engine in order to use heat of engine exhaust gas as a heat source. Therefore, a portion of exhaust gas is taken from the exhaust passage downstream from the gas reformer in this system, and this exhaust gas is mixed into source gas via an exhaust branch passage.

However, in internal combustion engines such as described above, exhaust gas to be mixed with fuel or source gas is taken from the vicinity of the farthest downstream portion of the exhaust passage. Thus, when the amount of residual fuel in the exhaust gas is increased in order to increase the amount of fuel fed to the gas reformer, this leads to a corresponding increase in the amount of unreformed fuel released to the atmosphere.

SUMMARY OF THE INVENTION

It is an object of the invention to provide an internal combustion engine capable of efficiently reforming and effectively recycling a portion of fuel included in exhaust gas from a combustion chamber, and thoroughly suppress the release of fuel in the exhaust gas to the atmosphere.

An aspect of the invention relates to an internal combustion engine capable of reforming and recycling a portion of fuel included in the exhaust gas from the combustion chamber. Such an internal combustion engine includes an exhaust passage where exhaust gas from the combustion chamber flows; a reformer that has a reforming reaction chamber including a fuel reforming catalyst for the fuel of the exhaust gas; a branch passage that branches from the exhaust passage at a branch portion provided upstream from the reformer, and directs exhaust gas to the reforming reaction chamber; and a fuel removal portion that removes the fuel, which is provided downstream from the branch portion.

In the internal combustion engine, the reformer with the reforming reaction chamber including the fuel reforming catalyst is disposed in the exhaust passage. Exhaust gas taken from the exhaust passage at the branch portion provided upstream from the reformer is directed to the reforming reaction chamber via the branch passage. Thus, the fuel included in the flowing exhaust gas is reformed in the reforming reaction chamber. The reformed fuel obtained can then be supplied to an air intake system as fuel again. In contrast, fuel in the exhaust gas not flowing from the exhaust passage to the branch passage is removed by the fuel removal portion provided downstream from the branch portion.

As described above, in the internal combustion engine, exhaust gas flowing to the reforming reaction chamber is taken from the exhaust passage at the branch portion provided upstream from the fuel removal portion. Therefore, it is possible to supply exhaust gas including the fuel to the reforming reaction chamber, and then efficiently reform and effectively recycle the fuel included in the exhaust gas. Furthermore, the fuel in the exhaust gas heading from the branch portion to the reformer is removed by the fuel removal portion provided downstream from the branch portion. Therefore, the release of fuel in the exhaust gas to the atmosphere is effectively suppressed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
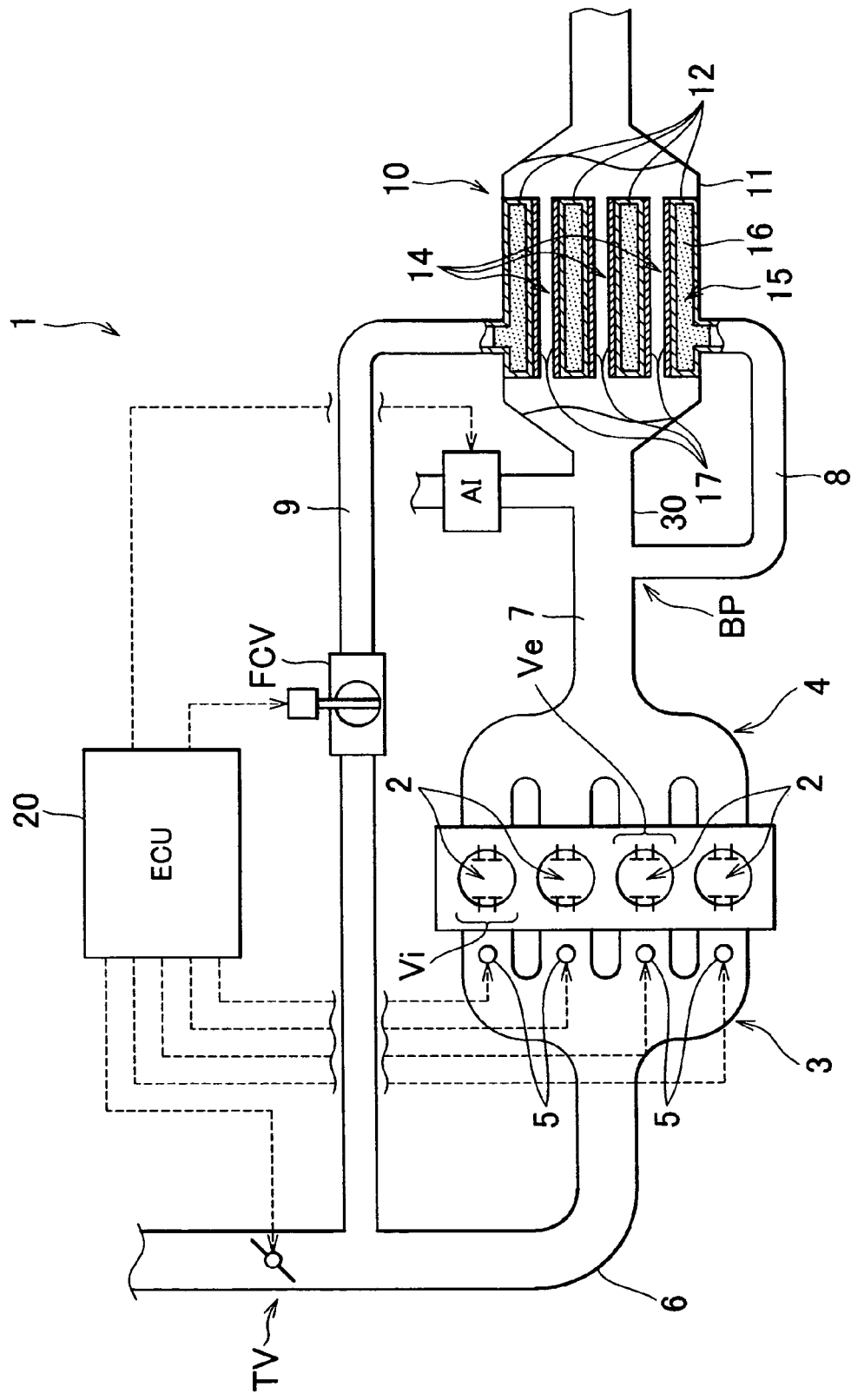
FIG. 1 is a schematic structural drawing showing an internal combustion engine according to an embodiment of the invention.

Hereinafter, a preferred embodiment for implementing the invention will be described in detail with reference to the accompanying drawing.

FIG. 1 is a schematic structural drawing showing an internal combustion engine according to an embodiment of the invention. An internal combustion engine 1 shown in FIG. 1 generates power by combusting a mixture, consisting of air and fuel such as gasoline, in a plurality of combustion chambers 2 formed in a cylinder block, and reciprocating pistons. The internal combustion engine 1 may, for example, be utilized as a drive source for running a vehicle. Furthermore, a portion of fuel included in exhaust gas from each combustion chamber 2 can be reformed and reused in the internal combustion engine 1.

As shown in FIG. 1, intake ports of the combustion chambers 2 are respectively connected to branch pipes of an intake manifold 3. Exhaust ports of the combustion chambers 2 are respectively connected to branch pipes of an exhaust manifold 4. Fuel injection valves 5 (fuel supply means) are disposed at each combustion chamber 2, and assure the injection of fuel toward the intake ports of the combustion chambers 2. Each fuel injection valve 5 is connected to a fuel supply source (not shown). In addition, the intake manifold 3 is connected to an intake passage 6, and a throttle valve TV such as a drive-by-wire type or the like is provided in the intake passage 6. Furthermore, in the cylinder head of the internal combustion engine 1, an intake valve Vi for opening and closing each intake port, and an exhaust valve Ve for opening and closing each exhaust port are provided in each combustion chamber 2 (one pair each in the embodiment). The intake valves Vi and exhaust valves Ve open and close according to a valve train (not shown), which may include a variable valve timing mechanism.

In contrast, the exhaust manifold 4 is connected to an exhaust passage 7 where exhaust gas from each combustion chamber 2 flows, and a reformer 10 is provided in the exhaust passage 7. The reformer 10 has a tubular body 11. Within the body 11, a heating medium passage 14 where exhaust gas from the exhaust passage 7 flows as a heat source is defined by walls 12, which are formed from a material with an excellent thermal conduction property. In addition, a reforming reaction chamber 15 is defined within the wall 12 so as to assure a heat exchange with the exhaust gas in the heating medium passage 14. The reforming reaction chamber 15 and the heating medium passage 14 are also defined so as to prevent the flow of exhaust gas. Moreover, a fuel reforming catalyst 16 such as Co, Ni or Rh, is disposed in the reforming reaction chamber 15.

A branch passage 8 branches from the exhaust passage 7 at a branch portion BP provided upstream from the reformer 10. As shown in FIG. 1, the branch pipe 8 is connected to the reforming reaction chamber 15 of the reformer 10, thus allowing exhaust gas to be taken from the exhaust passage 7 and supplied to the reforming reaction chamber 15. Furthermore, an end of a reformed fuel return passage 9 is connected to the reforming reaction chamber 15 of the reformer 10. The reformed fuel return passage 9 has flow control valve FCV situated partway, and another end that is connected to the intake passage 6 downstream from the throttle valve TV.

A secondary air supplier AI, such as an air pump, is connected to the exhaust passage 7 at a point downstream from the branch portion BP and upstream from the reformer 10 (a portion of the exhaust passage 7 between the branch portion BP and the reformer 10 will hereinafter be described as a main exhaust passage 30). Operating the secondary air supplier AI allows the supply of air (oxygen) to the heat medium passage 14 of the reformer 10. In addition, an exhaust purification catalyst 17 such as a platinum catalyst or the like is adhered (laminated) on an outer surface (surface on the heat medium passage 14 side) of the wall 12 of the reformer 10. The secondary air supplier AI and the exhaust purification catalyst 17 disposed on the heat medium passage 14 of the reformer 10 function as fuel removal means positioned downstream from the branch portion.

Furthermore, the internal combustion engine 1 is provided with an electronic control unit (hereinafter referred to as ECU) 20 that functions as control means. The ECU 20 includes a CPU, a ROM, a RAM, input and output ports, and a storage device (all not shown), which stores various data, maps and the like. Connected to the input and output ports of the ECU 20 are the fuel injection valves 5, the throttle valve TV, the flow control valve FCV, and the secondary air supplier AI. In addition, the valve train for opening and closing the intake valves Vi and the exhaust valves Ve, as well as various types of sensors are also connected to the input and output ports of the ECU 20. The ECU 20 controls a fuel injection amount and the like from the fuel injection valves 5 provided at each combustion chamber 2, based upon detection values or the like from various sensors, in addition to using various maps or the like stored in the storage device.

The reform and reuse of fuel in exhaust gas in the internal combustion engine 1 structured such as described above will be described next. While the internal combustion engine 1 is operating, the exhaust gas taken from the exhaust passage 7 at the branch portion BP (provided upstream from the reformer 10) is introduced via the branch passage 8 to the reforming reaction chamber 15 of the reformer 10. In the reforming reaction chamber 15 of the reformer 10, a reforming reaction (endothermic reaction) such as that shown in equation (1) below is advanced using heat from the exhaust gas flowing through the inside of the heat medium passage 14.

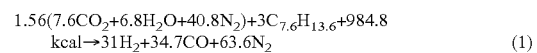

$$1.56(7.6CO_2+6.8H_2O+40.8N_2)+3C_{7.6}H_{13.6}+984.8 \text{ kcal} \rightarrow 31H_2+34.7CO+63.6N_2 \qquad (1)$$

Thus, fuel (for example, unburned fuel) within exhaust gas that flows from the exhaust passage 7 to the reforming reaction chamber 15 via the branch passage 8 is reformed. As a result, a reformed fuel containing the fuel components $H_2$ and CO is obtained. The reformed fuel obtained is supplied to the intake passage 6 via the reformed fuel return passage 9, which is provided with the flow control valve FCV, and effectively reused.

On the contrary, unburned fuel in the exhaust gas which does not flow from the exhaust passage 7 to the branch passage 8, and instead heads toward the heating medium passage 14 of the reformer 10 is removed using the secondary air supplier AI and the exhaust purification catalyst 17 provided downstream from the branch portion, and serve as the fuel removal means. In other words, air from the secondary air supplier AI is supplied to unburned fuel in the exhaust gas which flows to the heat medium passage 14 of the reformer 10 via the branch portion BP and the main exhaust passage 30, and the unburned fuel then reacts with and is purified by the exhaust purification catalyst 17 in the heat medium passage 14.

The ECU 20 in the embodiment controls the secondary air supplier AI based upon an air-fuel ratio of a mixture in each combustion chamber 2. That is, in the internal combustion engine 1, the amount of air supplied to the exhaust purification catalyst 17 is controlled according to the amount of fuel supplied (the air-fuel ratio control) to each combustion chamber 2. As a result, the amount of air supplied from the secondary air supplier AI to the inside of the heat medium passage 14 is set with high precision, in order to remove unburned fuel in the exhaust gas flowing into the heat medium passage 14 of the reformer 10 via the branch portion BP and the main exhaust passage 30.

As described above, in the internal combustion engine 1, it is possible to increase the amount of reformed fuel obtained by the reformer 10 as needed, by changing the mixture of the air and fuel in each combustion chamber 2 to rich using the ECU 20. In other words, leaving a considerable amount of unburned fuel in the exhaust gas from the combustion chambers 2 will result in the efficient reform and effective reuse of unburned fuel included in the exhaust gas from the combustion chambers 2 without an exclusive fuel supply mechanism which supplies fuel to the reforming reaction chamber 15 of the reformer 10.

In addition, it is no longer necessary to provide an exclusive fuel supply mechanism (fuel injection valve) in the vicinity of the exhaust passage 7, the reforming reaction chamber 15 or the like, whose temperature becomes high during operation of the internal combustion engine 1. Therefore, the cost of the engine can be lowered and the engine itself simplified, in addition to improving reliability. Moreover, the need to consider cooling of the fuel supply mechanism and the decrease in energy efficiency is also eliminated. Furthermore, in the internal combustion engine 1, exhaust gas flowing to the reforming reaction chamber 15 is taken from the exhaust passage 7 at the branch point BP provided upstream from the secondary air supplier AI and the exhaust purification catalyst 17, which serve as the fuel removal means. Consequently, it is possible to provide exhaust gas including a sufficient amount of unburned fuel to the reforming reaction chamber 15.

In addition, unburned fuel in the exhaust gas flowing from the branch portion BP to the heat medium passage 14 of the reformer 10 via the main exhaust passage 30 is removed by the secondary air supplier AI and the exhaust purification catalyst 17 provided downstream from the branch portion BP. As a result, in the internal combustion engine 1, it is thus possible to purify unburned fuel in the exhaust gas well, thereby thoroughly suppressing the release of unburned fuel to the atmosphere. The temperature of the reforming reaction chamber 15 can also be increased using heat generated by the reaction in the exhaust purification catalyst 17 in the internal combustion engine 1 provided with the secondary air supplier AI and the exhaust purification catalyst 17, which serve as the fuel removal means. This results in highly satisfactory acceleration of the above-mentioned reforming reaction expressed by equation (1) in the fuel reforming catalyst 16.

What is claimed is:

1. An internal combustion engine capable of reforming and recycling a portion of fuel included in exhaust gas from a combustion chamber comprising:
    an exhaust passage where exhaust gas from the combustion chamber flows;
    a reformer disposed in the exhaust passage to assure heat exchange with the exhaust gas from the exhaust passage and that has a reforming reaction chamber including a fuel reforming catalyst for reforming the fuel in the exhaust gas;
    a branch passage that branches from the exhaust passage at a branch portion provided upstream from the reformer, is connected to the reforming reaction chamber, and directs exhaust gas to the reforming reaction chamber,
    the reformer being disposed in a portion of the exhaust gas passage that is downstream from the branch portion so as to exchange heat with the exhaust gas that does not flow through the branch passage;
    a fuel removal portion that removes the fuel that does not flow from the exhaust passage to the branch passage, and which is provided downstream from the branch portion; and
    a reformed fuel return passage that returns the fuel reformed in the reforming reaction chamber to an intake system for recycling the reformed fuel to be used again as fuel in a combustion process.

2. The internal combustion engine according to claim 1, wherein the reformer is provided on the branch passage, and the fuel removal portion is provided on the exhaust passage.

3. The internal combustion engine according to claim 1, further comprising:
    a heat medium passage which is provided in the exhaust passage, and in which the exhaust gas flows as a heat source, wherein
    the reformer is provided so that heat is exchanged between the exhaust gas in the heat medium passage and the reforming reaction chamber.

4. The internal combustion engine according to claim 3, wherein the fuel removal portion includes an exhaust purification catalyst disposed in the heat medium passage of the reformer, and a secondary air supplier disposed between the branch portion and the reformer, which is capable of supplying air to the heat medium passage.

5. The internal combustion engine according to claim 3, wherein the fuel in the reforming reaction chamber is reformed by an endothermic reaction, and the reforming catalyst decreases activation energy of the endothermic reaction.

6. The internal combustion engine according to claim 1, wherein the reforming reaction chamber abuts on the exhaust passage.

7. The internal combustion engine according to claim 6, wherein the reforming reaction chamber is surrounded by the exhaust passage.

8. The internal combustion engine according to claim 6, wherein the fuel removal portion is provided in a portion of the exhaust passage that abuts on the reforming reaction chamber.

9. The internal combustion engine according to claim 1, wherein the exhaust passage and the reforming reaction chamber are defined such that exhaust gas does not flow therebetween.

10. The internal combustion engine according to claim 1, further comprising:
    a controller capable of changing a mixture of air and fuel in the combustion chamber to rich.

11. The internal combustion engine according to claim 10, further comprising:
    a heat medium passage which is provided in the exhaust passage, and in which exhaust gas flows as a heat source, wherein
    the fuel removal portion includes an exhaust purification catalyst disposed in the heat medium passage of the reformer, and a secondary air supplier disposed between the branch portion and the reformer, which is capable of supplying air to the heat medium passage, and the controller further adjusts an amount of air supplied to the heat medium passage by the secondary air supplier depending on an air-fuel ratio of the mixture.

12. An internal combustion engine capable of reforming and recycling a portion of fuel included in exhaust gas from a combustion chamber comprising:
    an exhaust passage where exhaust gas from the combustion chamber flows;
    a reformer disposed in the exhaust passage to assure heat exchange with the exhaust gas from the exhaust passage and that has a reforming reaction chamber including a fuel reforming catalyst for reforming the fuel in the exhaust gas;
    a branch passage that branches from the exhaust passage at a branch portion provided upstream from the reformer, is connected to the reforming reaction chamber, and directs exhaust gas to the reforming reaction chamber,
    the reformer being disposed in a portion of the exhaust gas passage that is downstream from the branch portion so as to exchange heat with the exhaust gas that does not flow through the branch passage;

fuel removal means for removing the fuel that does not flow from the exhaust passage to the branch passage, and which is provided downstream from the branch portion; and a reformed fuel return passage that returns the fuel reformed in the reforming reaction chamber to an intake system for recycling the reformed fuel to be used again as fuel in a combustion process.

13. The internal combustion engine according to claim 12, wherein the reformer is provided on the branch passage, and the fuel removal means is provided on the exhaust passage.

14. The internal combustion engine according to claim 12, further comprising:

a heat medium passage, which is provided in the exhaust passage, and in which the exhaust gas flows, wherein heat is exchanged between the exhaust gas in the heat medium passage and the reforming reaction chamber, and the fuel removal means includes an exhaust purification catalyst disposed in the heat medium passage of the reformer, and a secondary air supplier disposed between the branch portion and the reformer, which is capable of supplying air to the heat medium passage.

15. The internal combustion engine according to claim 14, further comprising:

control means capable of changing a mixture of air and fuel in the combustion chamber to rich.

16. An internal combustion engine capable of reforming and recycling a portion of fuel included in exhaust gas from a combustion chamber comprising:

an exhaust passage where exhaust gas from the combustion chamber flows;

a reformer disposed in the exhaust passage to assure heat exchange with the exhaust gas from the exhaust passage and that has a reforming reaction chamber including a fuel reforming catalyst for reforming the fuel in the exhaust gas;

a branch passage that branches from the exhaust passage at a branch portion provided upstream from the reformer, is connected to the reforming reaction chamber, and directs exhaust gas to the reforming reaction chamber;

a fuel removal portion that removes the fuel that does not flow from the exhaust passage to the branch passage, and which is provided downstream from the branch portion;

a controller capable of changing a mixture of air and fuel in the combustion chamber to rich; and a heat medium passage which is provided in the exhaust passage, and in which exhaust gas flows as a heat source, wherein the fuel removal portion includes an exhaust purification catalyst disposed in the heat medium passage of the reformer, and a secondary air supplier disposed between the branch portion and the reformer, which is capable of supplying air to the heat medium passage, and the controller further adjusts an amount of air supplied to the heat medium passage by the secondary air supplier depending on an air-fuel ratio of the mixture.

* * * * *